Sept. 9, 1941.  C. R. WASEIGE  2,255,574
WINCH FOR USE ON BOARD AIRCRAFT
Filed July 31, 1937  2 Sheets-Sheet 1
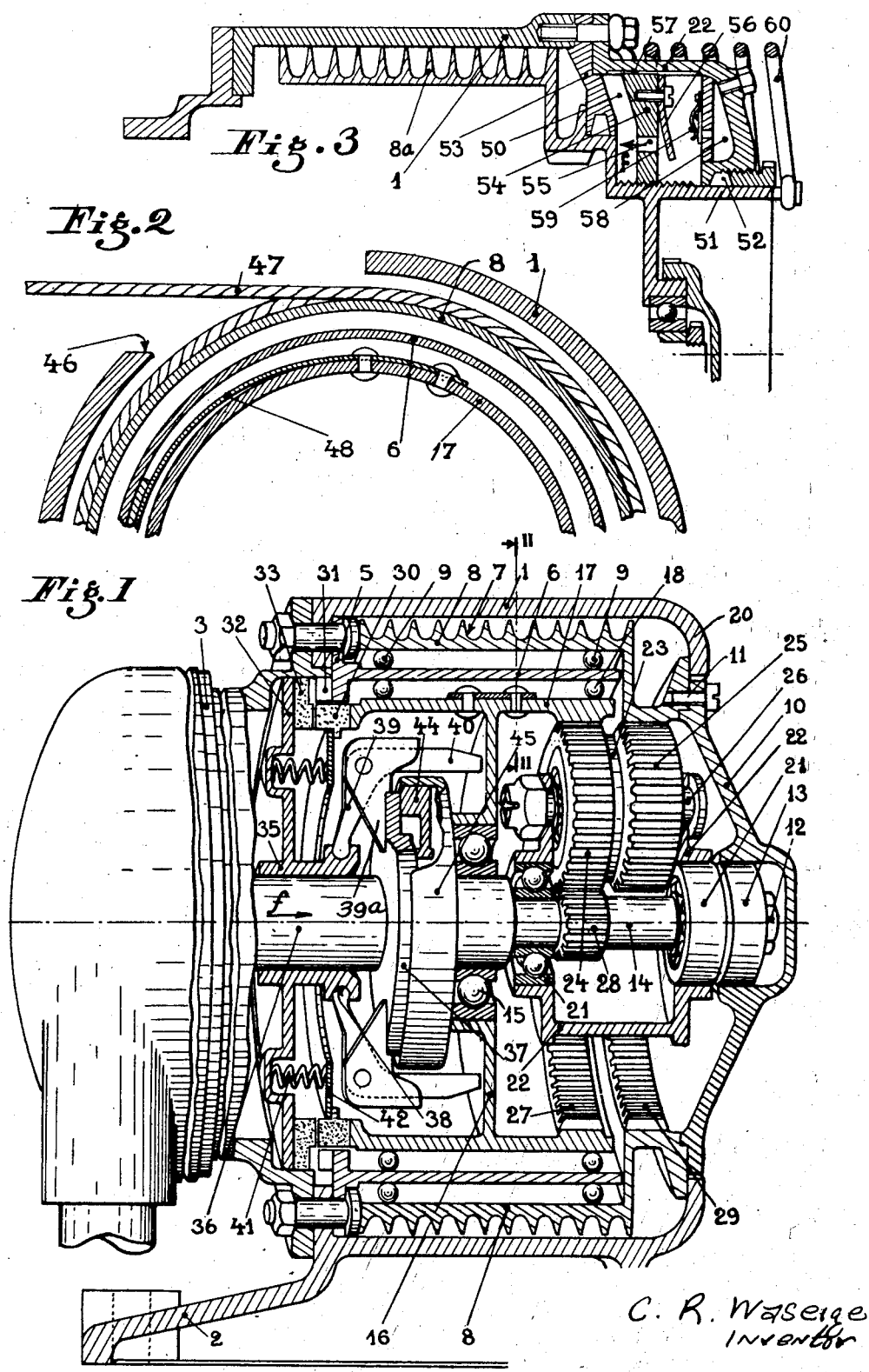

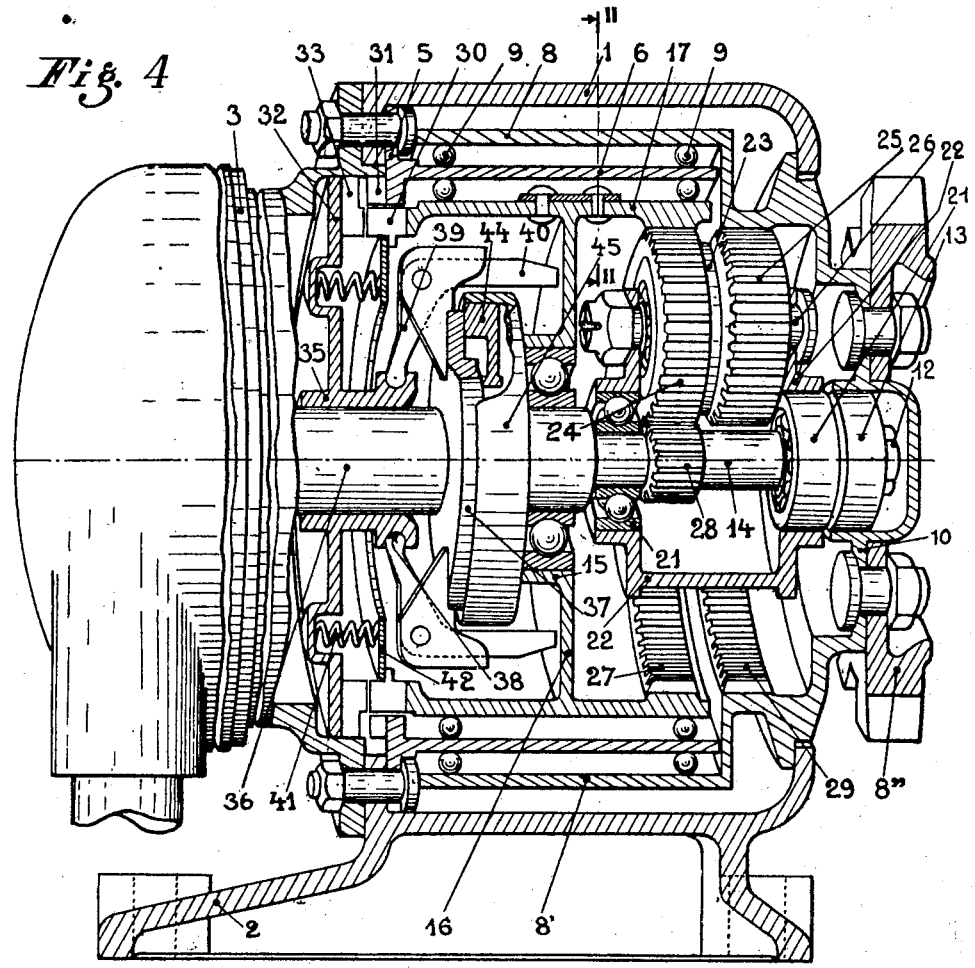

Patented Sept. 9, 1941

2,255,574

UNITED STATES PATENT OFFICE 2,255,574

WINCH FOR USE ON BOARD AIRCRAFT

Charles Raymond Waseige, Rueil, France, assignor to Air Equipment, Boulogne-Billancourt, Seine, France, a company of France Application July 31, 1937, Serial No. 156,759
In France August 8, 1936

6 Claims. (Cl. 254—187)

The present invention has for its object a winch which is more particularly intended to be used on board aircraft. One object of the invention is to provide a powerful winch of this class which will be of small bulk, of reduced weight and reliable in operation.

A further object of the invention is to provide a winch, in which a rotatable lifting member is drivable through a planetary speed reducer having a high reducing ratio and being therefore practically irreversible, with means such that the irreversibility imparted to the lifting member by the planetary reducer can be suppressed and thereby the load lifting member rendered reversible and the load enabled to descend by its own weight.

Other objects of the invention are to damp the free descent of the load by its own weight and to store energy in an auxiliary device during the descent of the load.

With these and still other objects in view the invention consists in the novel combination and arrangement of parts as will be described hereafter and more fully pointed out in the claims.

A preferred embodiment of the invention is illustrated in the accompanying drawings in which:

Fig. 1 is a vertical section through the axis of a winch provided with a grooved lifting drum, the motor being shown in outside view.

Fig. 2 is a section along the line II—II of Fig. 1 or of Fig. 4 and shows a detail.

Fig. 3 is a vertical section through the axis of a modification of construction of a detail.

Fig. 4 is a view of a modification of the winch illustrated in Fig. 1.

In the example of construction illustrated, the winch comprises a cylindrical body 1 of which the axis is horizontal and which is open at both ends and provided at its lower with a fixing base 2. On one of the ends of said body 1 and outside the latter is bolted the motor 3, in this case an electric motor the stub shaft of which penetrates inside the cylindrical body 1. On this same end of the cylindrical body 1, and likewise bolted by a collar 5 is a cylindrical sleeve 6 of substantially smaller diameter than that of the cylindrical body 1 so as to define with the latter an annular chamber 7. In said annular chamber 7 is lodged a grooved drum 8 which is centred on the outside of the sleeve 6 with interposition of the rollers 9. The end of the drum on the opposite side to the motor is closed by an end 10 which is fitted on and fixed by means of screws 11. On its inner face the end 10 forms at its centre a cup wherein is lodged a ball bearing 13 secured by a nut 12 mounted on an intermediate shaft 14 which is coaxial with the motor 3 and is supported at its other end by a ball bearing 15 lodged in the web 16 of a ring gear 17 centred in the sleeve 6 with interposition of balls 18. The assembly formed by the drum 8 and the end 10 is held axially inside the cylindrical body 1 by a retaining flange 20 of the end of the body 1 opposite to the motor 3.

The intermediate shaft 14 carries, through the medium of ball bearings 21, a planet gear support 22 provided for instance with two planet gears 23. Each planet gear 23 comprises a pinion having two toothings 24 and 25 which is mounted on ball bearings on its shaft 26. The toothing 24 meshes on the one hand with an internal toothing 27 of the ring gear 17 and, on the other hand, with a pinion 28 fixed on the shaft 14. Said pinion 28 is the driving sun wheel, whereas the ring or orbit gear 17 forms the driven wheel. The toothing 25 meshes with an internal toothing 29 of the grooved drum 8. The number of teeth or the diameter of the pinion 25 is slightly greater than the number of teeth or the diameter of the pinion 24. The gear ratio of the double epicyclic gearing 28, 24, 27, 25, 29 thus provided is so high that this gearing is practically irreversible. On the opposite side to the toothing 27, the ring gear 17 carries on its side clutch teeth 30, and clutch teeth 31 are also provided on the fixed sleeve 6. A plate 32 carries an annular set of clutch teeth 33 located opposite the clutch teeth 30 and 31 so that when said clutch teeth are engaged, the ring gear 17 is secured to the fixed sleeve 6, i. e. is held stationary the members 33, 30 and 31 thus cooperate together to act as a brake or lock adapted to hold the ring gear 17 against rotation. Said plate 32 is carried on a sleeve 35 loosely mounted and adapted to slide on the shaft 36 of a plate 37 which is keyed on the stub shaft (not shown) of the motor 3. In a groove 38 of the sliding sleeve are engaged fingers 39 pivoted to brackets 39a secured on the plate 37 and integral with centrifugal members 40 arranged in such a manner that in moving away from the axis they compel the fingers 39 to cause the sleeve 35, and consequently the plate 32, to slide in the direction f against the springs 41 arranged between said plate 32 and a bearing member 42 abutting against the ring gear 17. The clutch teeth 33 which are opposite the clutch teeth 31 are smaller in height than those located opposite the clutch teeth 30 so that the teeth 33 will remain in engagement with the teeth 30 in any position of the slidable plate 32 whereas they are in or out of engagement with the teeth 31 according to the position of said slidable plate 32. Consequently the plate 32 is always rotatably connected with the ring gear 17 whilst it is connected to or disconnected from the non-rotatable sleeve 6 in dependence on the position of the slidable plate 32.

The plate 37 carries in addition heads 44 which are radially movable inside a cup 45 provided at the end of the intermediate shaft 14; said heads 44 co-operate with the side wall of said cup so as to form a centrifugal friction coupling.

Apertures 46 (Fig. 2) are provided in the body 1 for the passage of the cable 47 which winds on the drum 8.

A circular leaf spring 48 is riveted on the outside of the loose ring gear or orbit 17 and it carries a friction lining which it presses against the inside of the fixed sleeve 6.

The operation is as follows:

When the motor 3 does not run the plate 32 is held disconnected from the stationary sleeve 6 by the springs 41; upon starting of the motor, the centrifugal coupling 44—45 engages at once and the driven sun wheel or ring gear 27 rotates loose since the plate 32 is loose. The centrifugal members 40 carried by the driving clutch member 37 are then subjected to centrifugal force which urges them to pivot outwardly, whereby the levers 39 are urged to move the slidable sleeve 35 in the direction of the arrow f against the antagonistic action of the springs 41 on the plate 32 longitudinally movable with said sleeve. For a given speed of the motor the action of the centrifugal members 40 will overcome the said antagonistic action of the springs 41 and sleeve 35 and plate 32 will be moved to the right and the clutch teeth 33 will engage the stationary clutch teeth 31, thereby locking against rotation the plate 32 and the ring gear 27 permanently connected to the latter by the clutch teeth 33—30. The ring gear 27 is thus held stationary and the toothing 25 then rotates the drum 8 at a reduced speed since the number of teeth or the diameter of the pinion 25 is slightly greater than the number of teeth or the diameter of the pinion 24. At this instant, the brake 48 is inoperative since the two parts 6 and 17 are stationary.

When the motor stops or is slown down to a speed less than the aforesaid speed the springs 41 move back the plate 32 and the sleeve 35 to the position illustrated in Fig. 1 where the teeth 33 are disengaged from the stationary teeth 31 and the ring gear 27 and the drum 8 are loose, thus permitting of self-lowering of the load by the weight of the latter. Racing of the drum 8 is prevented by the braking device 48 which creates a tension on the cable and prevents its unwinding under the effect of the inertia of the parts in motion.

The modified embodiment illustrated in Fig. 4 differs from the former by the fact that the grooved drum 8 is replaced by a smooth drum 8' and a sprocket wheel 8'' bolted on the outside of the end 10 which is integral with the drum 8'. The sprocket wheel 8'' engages a load chain, not an endless chain, and therefore acts as a load lifting member, as does the drum 8 of the embodiment illustrated in Fig. 1 and not as a member of a chain gearing. The smooth drum 8' in that case serves only as a carrier member for the sprocket wheel 8'' and not as a winding member for a rope for centering.

In the modification of Fig. 3 the aforesaid friction device is replaced by a hydraulic braking device. For this purpose an annular chamber 50 is provided around an axial trunnion 51 of the drum 8a; said chamber is bounded by said trunnion, the wall of the fixed body 22 which forms a stuffing box 52 around the said trunnion and an inner transverse annular partition 53 fixed to the body 22 and carrying a sealing joint which co-operates with a cylindrical bearing surface of the drum 8a. Inside said chamber 50, which is liquid-tight and full of liquid, is slidably fitted an axially movable annular plate 54 provided with screw-threads in engagement with a correspondingly threaded portion of the trunnion 51. Said plate 54 carries at its periphery two tenons engaged in grooves of the body 22 so that it can slide axially in the chamber 50 but cannot rotate. Holes 55 pass through said plate 54 and flap valves 56 are mounted on one of the faces of the plate 54, opposite said holes 55; on the other hand, grooves 57 of small cross-section in the wall of the fixed body place the two compartments formed in the chamber 50 by the plate 54 constantly in communication with each other.

When the drum 8a rotates in the direction for raising the load, the plate 54 moves in the direction f, the direction of the thread having been determined for this purpose, and the flap valves 56 open to allow the liquid to pass from one compartment to the other through the holes 55. No braking is produced. When the load is being lowered, the plate 54 moves in the opposite direction, the flap valves 56 close and the liquid is driven through the grooves 57 thereby producing a braking which is dependent on the cross-section of said grooves and consequently on the position of the plate 54 inside the chamber 50 since the cross-section of the grooves is not the same everywhere. Preferably, said grooves are given a total cross-section of minimum passage towards the middle of the chamber and a maximum cross-section which does not produce any braking towards the end of the chamber which the plate 54 approaches towards the end of the descent of the load.

An auxiliary supply chamber 58 is provided in the body 22 and communicates through a flap or a calibrated valve 59 with the chamber 50. Said supply chamber 58 contains a reserve of liquid and will automatically make up for the waste of liquid from the chamber 50 since any waste of liquid from this chamber 50 will produce a depression within this chamber and consequently an opening of the valve 59 and a flow of liquid from the supply chamber 58 into the chamber 50 until the pressure within said chambers becomes substantially the same.

On the other hand, the winch includes an energy storing device consisting in the example of construction shown in the drawings of a torsion spring 60 one end of which is fixed to the fixed body 1 and the other end to the trunnion 51.

Of course, the invention is in no way limited to the details of construction illustrated or described which have only been given by way of example. Thus, although the motor is preferably electric, it can also be operated by compressed air, fluid under pressure or the like. Similarly, the power can be transmitted on the outside, by cable, sprocket wheel, belt, gears, intermediate shaft, etc.

What I claim is:

1. A winch adapted to be used on board aircraft, comprising a stationary casing including a cylindrical hollow body, a motor secured on one end of said body, a cylindrical sleeve located within said cylindrical body coaxially therewith, secured to the same end as the motor and defining with the body an annular chamber, a rotatable load lifting member including a cylindrical hollow part located within said annular chamber and rotatably centered upon said sleeve, a cylindrical rim located and rotatably centered within said sleeve, a ring gear internally provided on said rim, a shaft from the motor extending axially of said coaxial cylindrical members, a driving wheel keyed on said shaft, planets between said wheel and ring gear, a carrier centered on said shaft for said planets, a ring gear provided on the load lifting member, wheels carried by said planet carrier and in mesh with said latter ring gear, means respectively provided on said casing and rim to cooperate together as a lock adapted to hold said rim against rotation, and control means for said lock, said control means including centrifugal members driven from said motor and being arranged to control the lock to hold or release the rim according as the motor speed is above or below a predetermined speed.

2. In a winch to be used on board aircraft, comprising a stationary frame structure, a rotatable load lifting member and a motor both carried by said structure, motion transmitting means adapted to provide a driving connection from said motor to said load lifting member and including a high ratio reducer; said reducer including a driving member rotatable from said motor through a part of said motion transmitting means and a loosely rotatable gear member included in that part of said motion transmitting means comprised from said driving member to the load lifting member, means adapted to act as a lock and arranged to be capable of coupling said loosely rotatable gear member to said stationary structure and thereby hold stationary said gear member, said lock-acting means including spring means arranged to hold it in uncoupling position, and control means for said lock-acting means, said control means including centrifugal members rotatably connected to said motor and connected to said lock-acting means to urge it to coupling position against said spring means in response to the motor speed increasing up to a predetermined speed.

3. In a winch to be used on board aircraft, comprising a stationary frame structure, a rotatable load lifting member and a motor both carried by said structure, motion transmitting means adapted to provide a driving connection from said motor to said load lifting member and including an irreversible high ratio planetary reducer, said planetary reducer including planet wheels in mesh both with a driving wheel and with a loosely rotatable driven wheel, means adapted to act as a lock and arranged to be capable of keying said loosely rotatable driven wheel to said stationary structure, and control means for said lock-acting means, said control means including centrifugal members rotatably connected to that part of said motion transmitting means comprised from the motor to said driving wheel, and said control means being connected to said lock-acting means to cause it to come into keying or releasing position in response to the motor speed being above or below a predetermined speed.

4. In a winch to be used on board aircraft, comprising a stationary frame structure, a rotatable load lifting member and a motor both carried by said structure, motion transmitting means adapted to provide a driving connection from said motor to said load lifting member and including a high ratio reducer; said reducer including a driving member rotatable from said motor through a part of said motion transmitting means and a loosely rotatable gear member included in that part of said motion transmitting means comprised from said driving member to the load lifting member, means adapted to act as a lock and arranged to be capable of coupling said loosely rotatable gear member to said stationary structure and thereby hold stationary said gear member, said lock-acting means including spring means arranged to hold it in uncoupling position, a centrifugal friction coupling included in that part of said motion transmitting means from the motor to said driving member, and control means for said lock-acting means, said control means including centrifugal members rotatably connected to said motor and connected to said lock-acting means to urge it to coupling position against said spring means in response to the motor speed increasing up to a predetermined speed.

5. A winch as claimed in claim 1 further comprising a friction device between the cylindrical sleeve and the rim.

6. A winch as claimed in claim 1 further comprising a leaf spring externally secured to the rim and forming around same an arcuate portion of an excentric ring, and a friction lining externally provided on said spring and in engagement with the inner wall face of the cylindrical sleeve.

CHARLES RAYMOND WASEIGE.